(12) United States Patent
Tsunoda (10) Patent No.: US 6,246,335 B1
(45) Date of Patent: *Jun. 12, 2001

(54) PORTABLE INFORMATION EQUIPMENT SYSTEM AND CONTROL METHOD THEREOF

(75) Inventor: Kazuyuki Tsunoda, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,298

(22) Filed: Nov. 18, 1997

Related U.S. Application Data (63) Continuation of application No. 08/752,747, filed on Nov. 21, 1996, now abandoned, which is a continuation of application No. 08/361,935, filed on Dec. 22, 1994, now abandoned.

(30) Foreign Application Priority Data

Dec. 28, 1993 (JP) ........................................ 5-334559

(51) Int. Cl.⁷ ...................................... H04Q 7/14
(52) U.S. Cl. ...................................... 340/825.44
(58) Field of Search ................. 340/825.44, 311.1; 455/343, 296, 310, 317, 228, 38.1, 38.2, 38.3; 375/219, 346

(56) References Cited

U.S. PATENT DOCUMENTS

| | | | |
|---|---|---|---|
| 4,879,758 | * 11/1989 | DeLuca et al. | 455/296 |
| 4,991,184 | * 2/1991 | Hashimoto | 375/219 |
| 5,043,721 | * 8/1991 | May | 340/825.44 |
| 5,142,699 | * 8/1992 | Sato et al. | 455/343 |
| 5,257,307 | * 10/1993 | Ise | 379/57 |
| 5,459,456 | * 10/1995 | Hosack et al. | 340/825.44 |

FOREIGN PATENT DOCUMENTS

| | | | |
|---|---|---|---|
| 5-153029 | 6/1993 | (JP) . | |
| 9111889 | * 8/1991 | (WO) | 340/825.44 |

* cited by examiner

Primary Examiner—Edwin C. Holloway, III
(74) Attorney, Agent, or Firm—Ostrolenk, Faber, Gerb & Soffen, LLP

(57) ABSTRACT

A portable information equipment system including of a paging data receiver and portable information equipment. The paging data receiver has an intermittent receiving circuit for intermittently receiving radio selective calling signals and a notification circuit for notifying reception start information of the intermittent receiving circuit to the portable information equipment. The portable information equipment has a switching circuit for switching a system clock rate of the portable information equipment to a lower rate in response to notification from said notification means.

9 Claims, 8 Drawing Sheets

PRIOR ART

PORTABLE INFORMATION EQUIPMENT SYSTEM AND CONTROL METHOD THEREOF

This is a Continuation of Application Ser. No. 08/752,747, filed Nov. 21, 1996 now abandoned, which is a Continuation of Application Ser. No. 08/361,935, filed on Dec. 22, 1994, now abandoned.

BACKGROUND OF THE INVENTION

The present invention relates to a portable information equipment system comprising a paging data receiver connected to a card slot of such portable information equipment as palmtop computers or portable personal computers (hereafter referred to as personal computers), etc.

In recent years, advances have been made in networking personal computers and expanding their multimedia applications. Today, businesses are adopting personal computer LAN systems and using E-mail and host data bases to improve communications and ultimately to increase the efficiency of their office work.

There is an increasing demand to extend the availability of these office communication environments outside the office. As a result, personal computers of increased portability are coming into common use.

Mobile computing as a communication method using portable personal computers, a method of ingesting and using various kinds of radio data such as E-mail, schedule data, and the like by a portable personal computer using a wireless modem for example, has become popular.

These portable personal computers are equipped with card slots for connecting with external devices. The PCMCIA (Personal Computer Memory Card International Association) and JEIDA (Japan Electronic Industry Development Association) are promoting standardization of these card slots.

Wireless modems using these card slots for the above-mentioned portable personal computers with card interfaces are being commercialized. One form of wireless modem using the card slots of these portable personal computers is a paging data receiver.

A system for ingesting radio information received by the paging data receiver into a portable information, equipment such as palmtop computers, etc. is disclosed in Japanese Patent Laid-Open No.153029 (1993), etc.

Figure 8:
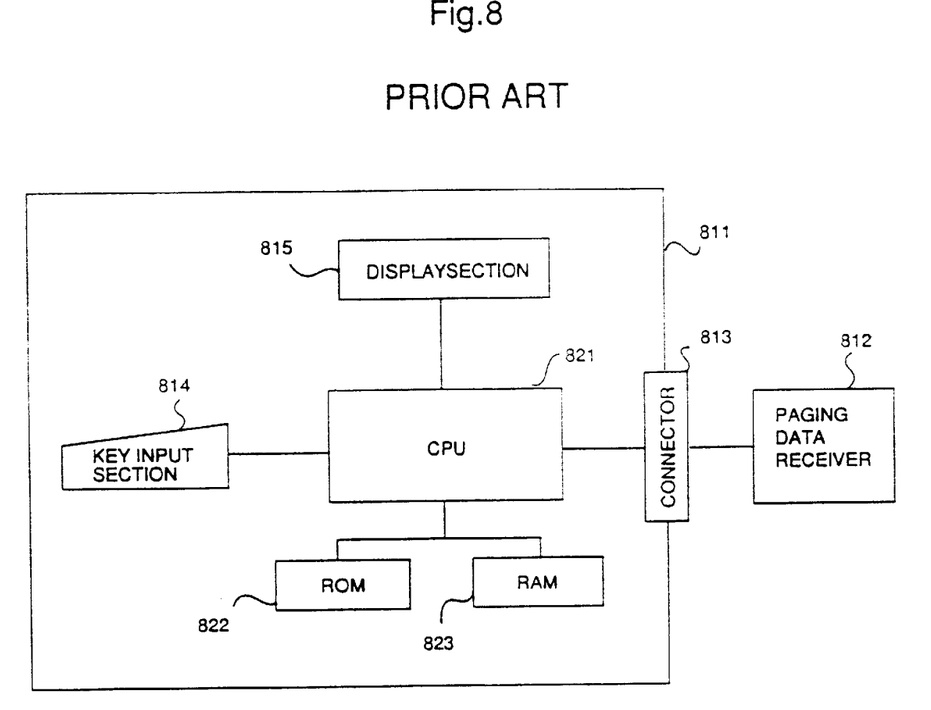
FIG. 8 is a block diagram of a prior portable information equipment system.

As shown in FIG. 8, the art disclosed in the Japanese Patent Laid-Open No.153029 (1993) is configured so as to store a message data or a schedule data received by a paging data receiver 812 in a RAM 823 through a connector 813 and a CPU 821 in a palmtop computer (a portable information equipment) 811, and display it on a display section 815 with an instruction from a key input section 814 if necessary.

Unlike prior configurations for using an isolated paging data receiver, paging data receiver configuration with card interfaces using the card slots of the above-mentioned portable information equipment entails the danger that the effects of higher harmonic noise radiation of the portable information equipments' processing clocks (system clocks) will cause marked deterioration in reception sensitivity of the paging data receiver.

This presents the problem of reduced size of the service areas of radio selective callings due to this deterioration in sensitivity.

SUMMARY OF THE INVENTION

It is an object of the present invention to provide a portable information equipment system which is effective to to minimize the effects of system clocks' higher harmonic noise radiation at receiving data with a paging data receiver through solving above-mentioned problems.

The above mentioned object of the present invention is achieved by a portable information equipment system comprising a paging data receiver having an intermittent receiver for intermittently receiving radio selective calling signals and a notification means for notifying reception start information of the intermittent receiver, and a portable information equipment having a switching means for switching a system clock rate of the portable information equipment low based on the reception start information from the notification means.

When the paging data receiver connected to a card slot of the portable information equipment starts to receive a radio signal, the portable information equipment system of the present invention transmits, in advance, radio section start information to the portable information equipment and reduces a system clock frequency of the portable information equipment. By these operations the system of the present invention minimizes the effects of radiation noise from the portable information equipment during receiving radio signals.

This and other objects, features and advantages of the present invention will become more apparent upon a reading of the following detailed description and drawings.

DESCRIPTION OF THE PREFERRED EMBODIMENTS

Figure 1:
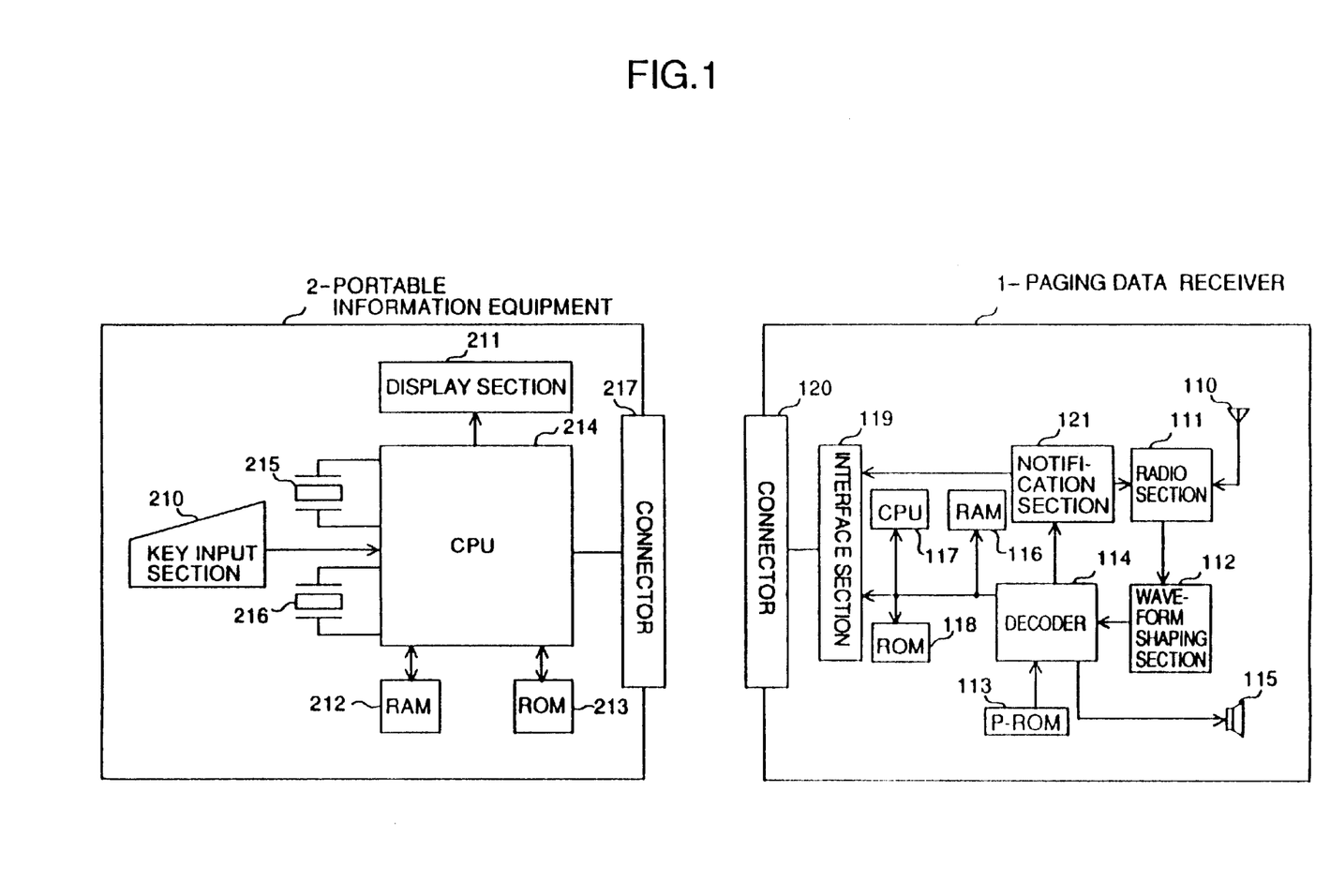
FIG. 1 is a block diagram of the first embodiment of the present invention.

Following is an explanation of this invention with reference to the figures. FIG. 1 is a block diagram of the first embodiment of the present invention.

The portable information equipment system of the present invention comprises a paging data receiver 1 and a piece of portable information equipment 2. Here, the portable information equipment 2 is a portable personal computer, a palmtop computer or the like.

Next, the configurations of the paging data receiver 1 are explained.

110 is an antenna for receiving radio selective calling signals.

111 is a receiving section for amplifying and demodulating received radio selective calling signals through the antenna 110.

112 is a waveform shaping circuit for converting demodulated signals in the receiving section 111 to digital signals that are readable by a decoder 114.

113 is a P-ROM (Programmable-Read Only Memory) for storing its own selective calling numbers.

114 is the decoder that compares a data signal from the wave shaping circuit 112 with its own selective calling numbers stored in the P-ROM 113. And if the numbers match, the decoder 114 outputs an alert signal and receives a message signal following the matched own calling number and outputs the signal to a RAM 116.

115 is a loudspeaker for notifying a user carrying the paging data receiver of a caller. The loudspeaker 115 generates an alert sound by the alert signal from the decoder 114.

116 is an RAM (Random Access Memory) for storing message data from the decoder 114.

117 is a CPU for conducting message processing, etc. according to programs written in a ROM (Read Only Memory) 118.

119 is an interfacing section for the paging data receiver 1 and the portable information equipment 2.

120 is a connector. The paging data receiver 1 and the portable information equipment 2 are connected with this connector 120 and a connector 217 of the portable information equipment 2 described later.

121 is a notification means for notifying the portable information equipment 2 of reception information at a timing described later.

Next, the configurations of the portable information equipment 2 is explained.

210 is a key input section for inputting necessary data by a user.

211 is a display section for displaying various data and characters input by the user.

212 is a RAM for storing various data.

213 is a ROM for storing necessary programs and font data.

214 is a CPU for executing various kinds of processing. As system clocks used for operations, the CPU 214 uses a main clock 215 and subclock 216 of which clock frequency is lower than that of the main clock 215. These clocks are changed for use based on information from the notification means 121 of the paging data receiver 1.

217 is a connector of portable information equipment 2.

Operations of the portable information equipment system configured as above are explained below.

Figure 2:
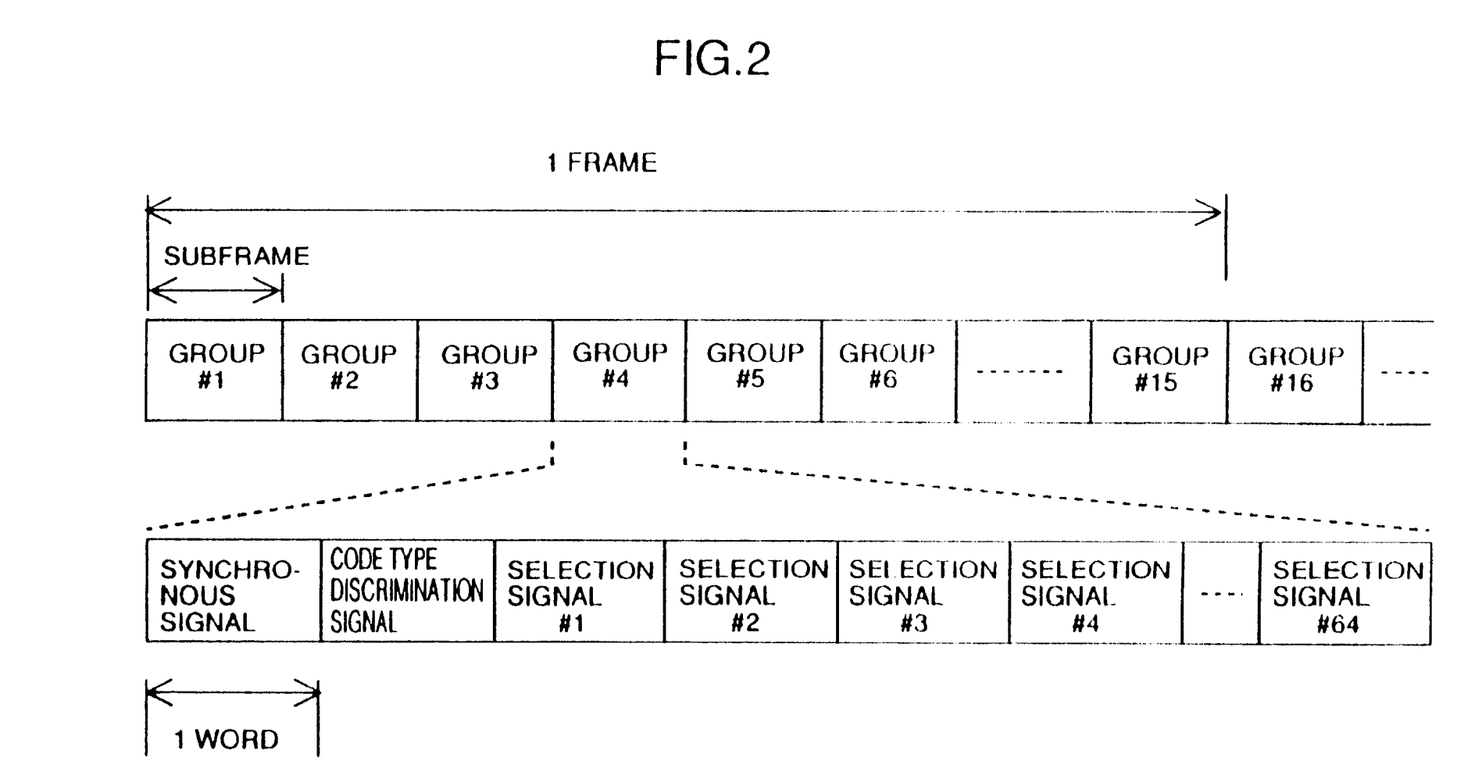
FIG. 2 is a figure for showing a format as an example of a radio calling signal used by a paging data receiver of the embodiment.

First, a format of a radio selective calling signal used in this embodiment is explained.

FIG. 2 is a figure for showing a format of a radio selective calling signal used by the paging data receiver 1 of this embodiment.

As shown in FIG. 2, the format of the radio selective calling signal is configured by repetition of a frame consisting of 15 subframes. Each subframe includes a synchronous signal, code type discrimination signal and 64 selection signals. The code type discrimination signal consists of 64 bits and each bit corresponds to each selection signal following the code type discrimination signal.

A numeral 1 in the bit string represents address information and a numeral 0 in the bit string represents message information. For example, when a code type discrimination signal string is 100101 . . . , selection signals #1, #4 and #6 represent address information, and selection signals #2, #3 and #5 represent message information. Namely, the paging data receiver 1 compares address information among these radio selective signals with its own calling numbers, and if there is a matching, the paging data receiver 1 demodulates and stores message information following the address information.

Figure 3:
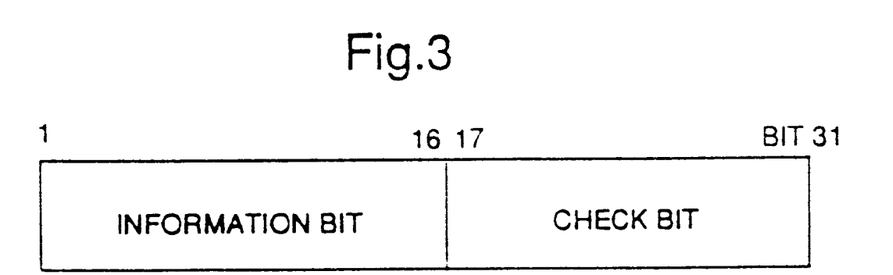
FIG. 3 is a figure for showing an example of a configuration of the radio selective calling signal used in the embodiment.

FIG. 3 shows an example of a configuration of the radio selective calling signal explained in FIG. 2.

In FIG. 3, an example of Bose-Chaudhuri-Hocquengham code (hereinafter, referred to as BCH code) (31, 16) comprises a BCH code consisting of a 16 bit information bit and 15 bit check bit.

Figure 4:
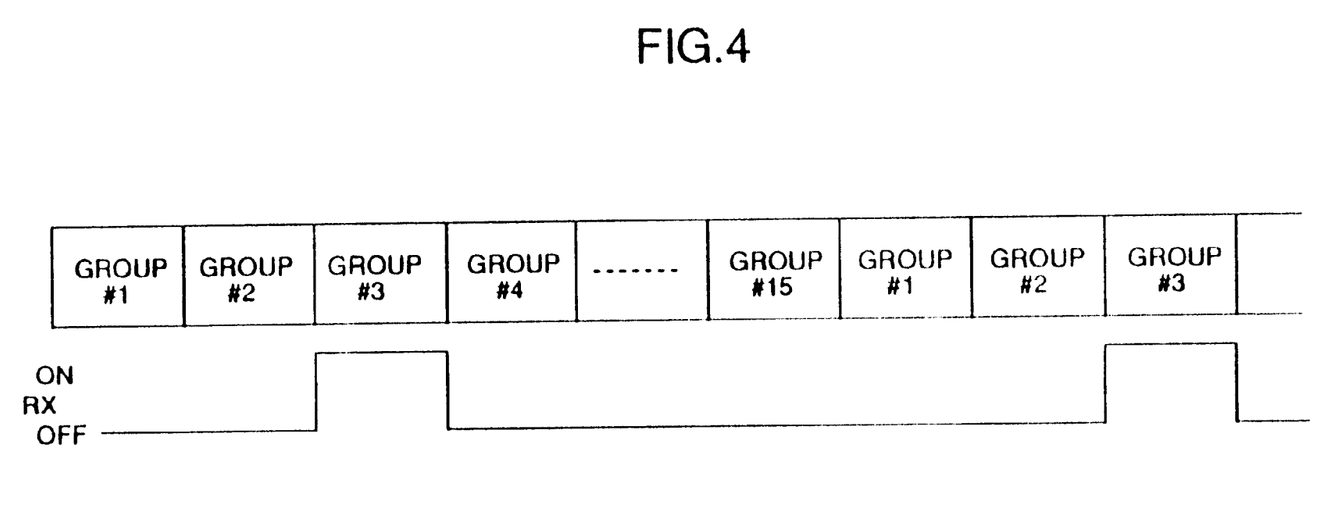
FIG. 4 is a timing chart for showing intermittent receiving operations in the embodiment.

FIG. 4 is a timing chart for showing intermittent receiving operations in this embodiment.

The paging data receiver 1 conducts intermittent reception to save power consumption. For example, the paging data receiver 1 supplies power at the group (subframe) (e.g. group #3 in FIG. 4) to which it belongs in a frame consisting of 15 groups (subframes) explained in FIG. 2 to the radio section 111, and demodulates the radio signals. Similarly, it is conducting intermittent reception for the subframes explained in FIG. 2, and it does not receive messages following an information address if the address information does not coincide with own calling number.

Next, operations for receiving the above-mentioned radio calling signals.

Figure 5:
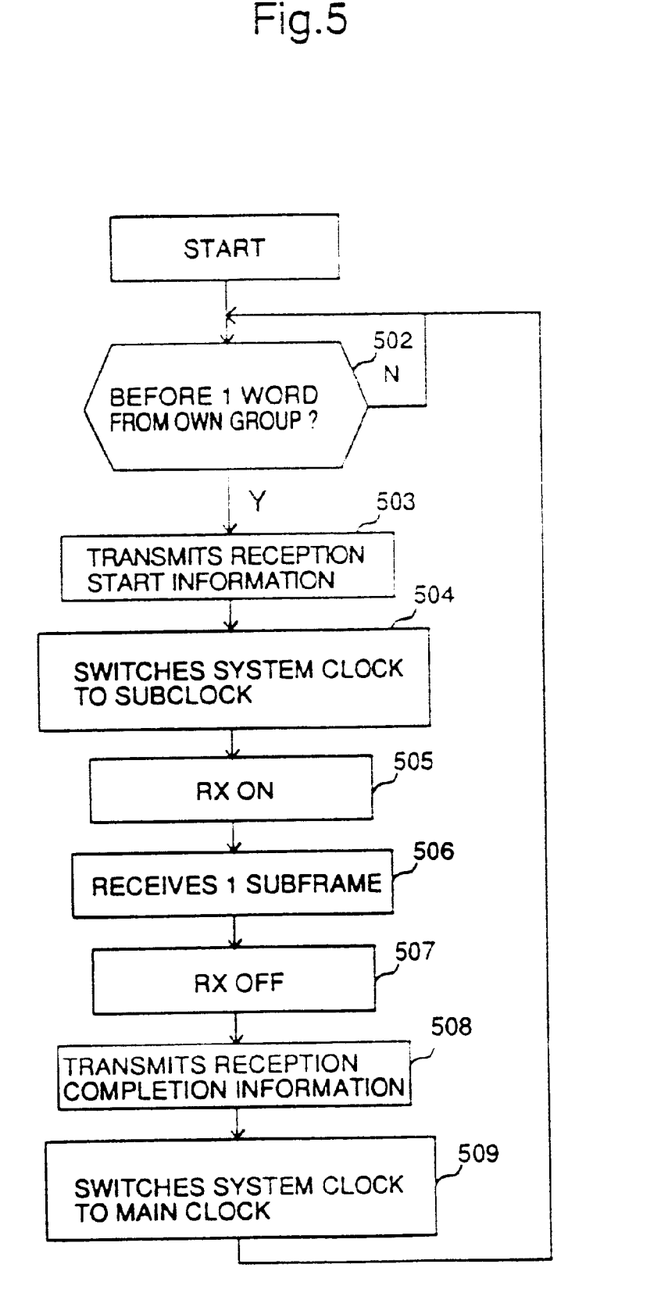
FIG. 5 is a flow chart of operations of the first embodiment.

FIG. 5 is a flow chart of operations of this embodiment.

First, at the timing before one word from the own group (502), the notification means 121 transmits start information for notifying start of intermittent reception to the CPU 214 in the piece of portable information equipment 2 (503).

The CPU 214 switches the system clock from the main clock 215 to the subclock 216 that is slower than that of the main clock 215 (504).

The notification means 121 switches the system clock to the subclock 216, then starts the receiving section 111 in the paging data receiver 1 (505). After having received one subframe (506), it stops the radio section (507) and transmits reception complete information to the CPU 214 in the portable information equipment 2 (508).

In the CPU 214 in the portable information equipment 2, the system clock is restored to the main clock 215 based on the reception completion information.

Like this, by making the clock rate slower during receiving operations, higher harmonic noise radiation is reduced.

Next, the second embodiment is explained.

Figure 6:
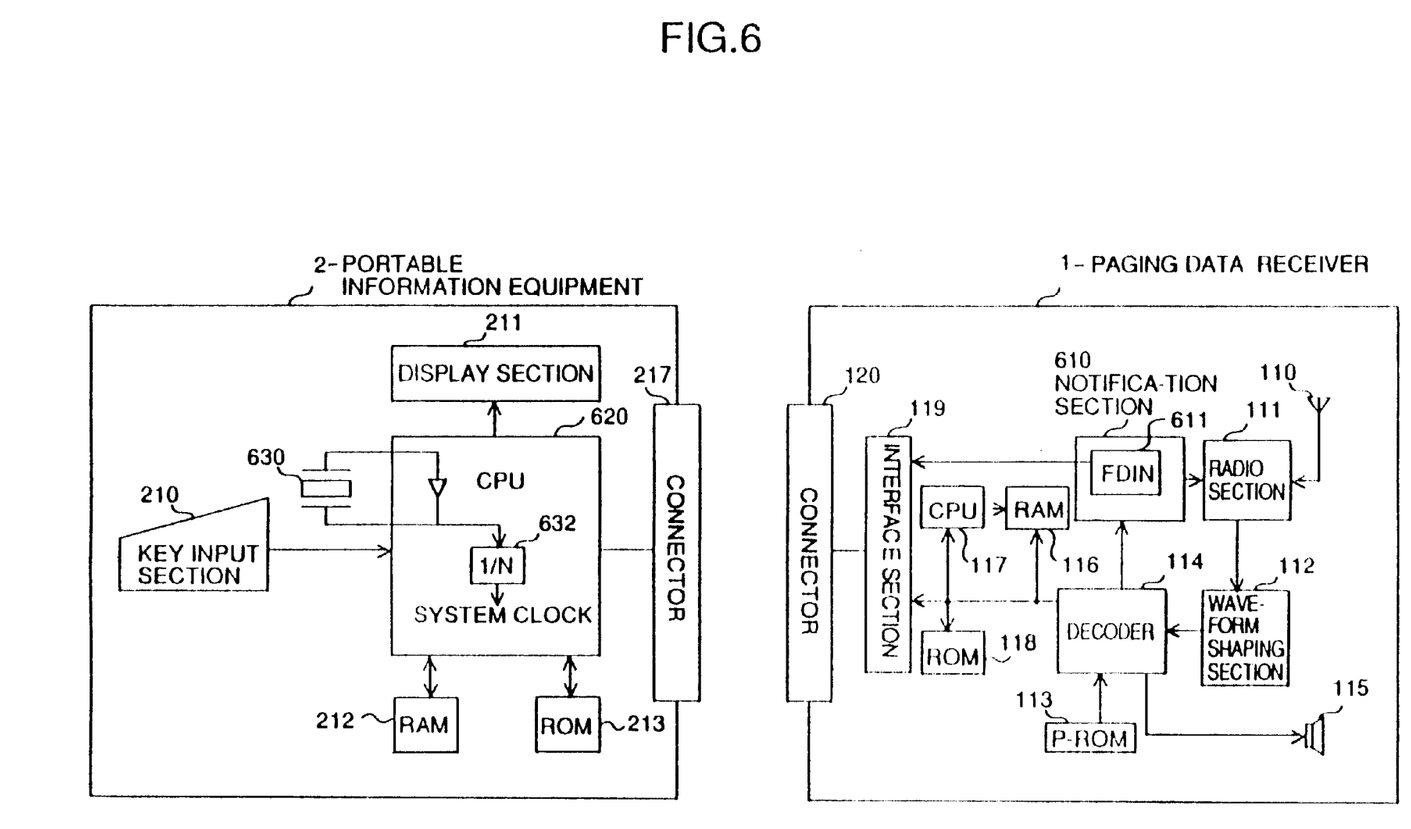
FIG. 6 is a block diagram of the second embodiment of the present invention.

Referring to FIG. 6, this second embodiment, similarly to the first embodiment, the notification means 610 is configured so as to transmit the start information and the completion information to the CPU 620 in the portable information equipment 2. The frequency division ratio information notification means 611 (hereinafter, referred to as FDIN 611) in the notification means 610 is configured so as to transmit frequency division information for determining the system clock rate of the CPU 620, as described later.

In addition, the CPU 620 in the portable information equipment 2 comprises an oscillator 631 for the clock 630 and a frequency divider 632 for dividing the output from the oscillator 631 based on frequency division information from the notification means 610. The system clock is supplied with the output from the frequency divider 632. It is to be noted that the CPU 620 is made of Intel i486.

Next, operations of the system configured as above will be described.

Figure 7:
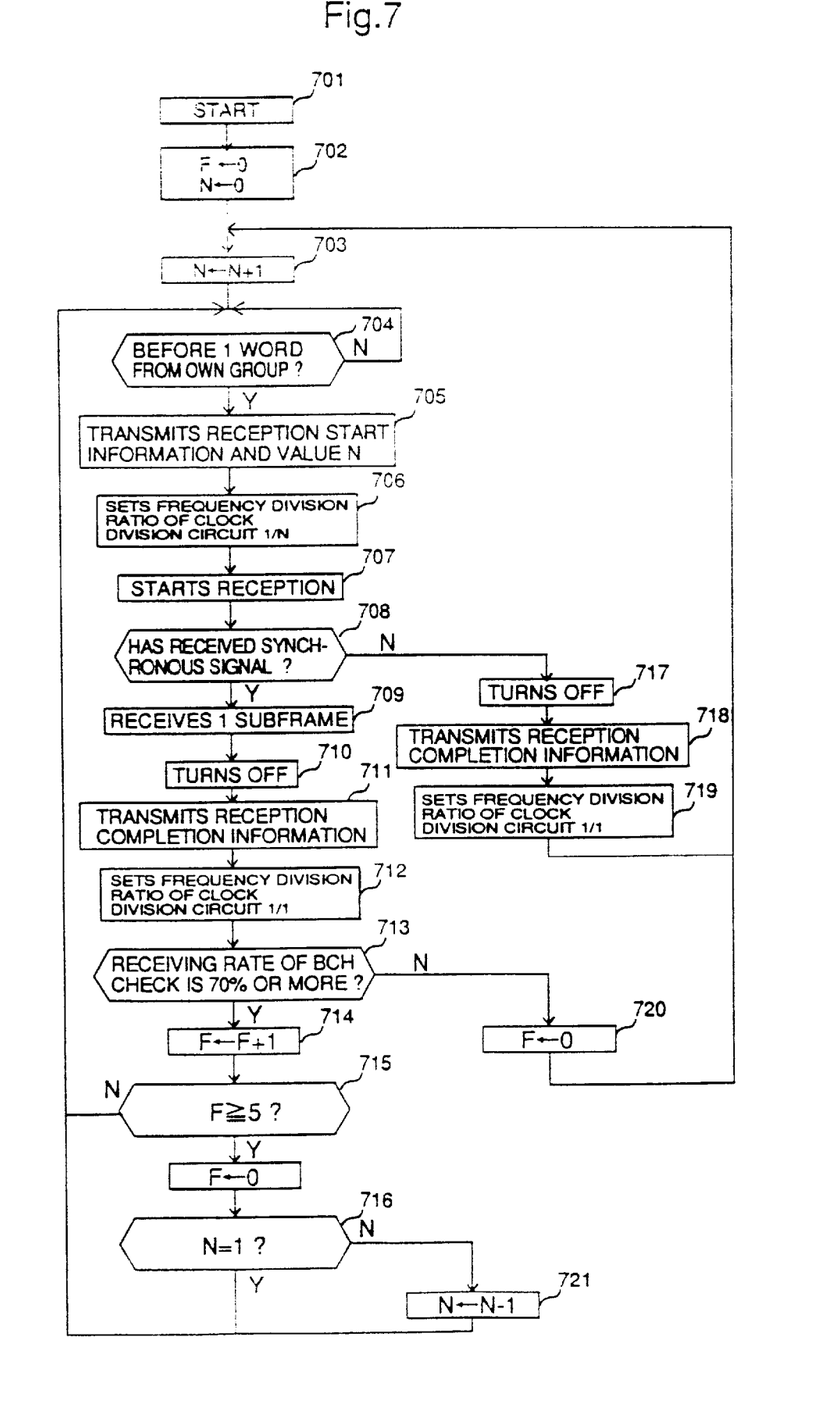
FIG. 7 is a flow chart of operations of the second embodiment.

FIG. 7 is a flow chart of operations of the second embodiment. In this figure, the variable N is a frequency division ratio of the frequency divider 632 and the variable F is a number of error detection check.

First, the FDIN 611 initializes the variables F and N as 0 (702).

Next, the FDIN 611 substitutes N+1 for the N and makes frequency division ratio be 1 (703).

Then, before one word from the own group (704), the notification means 610 (FDIN 611) transmits reception start information of the radio section 111 and the current N value to the CPU 620 in the portable information equipment 2 (705).

In the CPU 620 in the portable information equipment 2, the frequency division ratio of the frequency divider 632 is set to 1/N (706). Moreover, at the beginning of the start of reception, the frequency division ratio is 1.

In the paging data receiver 1, the radio selection 111 is started (707) and awaits a synchronous signal (708).

If a synchronous signal is not detected at this time, the radio section 111 is turned off (717) and a reception completion information indicating that the radio section 111 has been turned off is sent to the CPU 620 in the portable information equipment 2 (718). In the CPU 620, the frequency division ratio of the clock divider is set to 1 (719) and the CPU 620 returns in high speed processing.

Moreover, in the notification means 610, as described later, the frequency ratio is incremented by 1 for following reception (703).

On the other hand, when a synchronous signal has been received (708), a selection signal for one subframe is received (709) and the radio section 111 is turned off (710). Then, the notification means 610 transmits reception completion information indicating that the radio section has been turned off to the CPU 620 in the portable information equipment 2. In the CPU 620, the frequency division ratio of the clock divider is set to 1/1 (712), the CPU 620 returns in high speed processing.

Additionally, in the paging data receiver 1, a BCH check is conducted at reception of a one subframe selection signal. If a result of the BCH check is 70% or more (713), the FDIN 611 increments 1 for the BCH check number F (714).

If the results of BCH check continuously go over 70% more than five times (715) and the current N value is not 1 (716), N-1 is substituted for N (721), namely decrement by 1, and the receiver awaits own group again (704).

On the other hand, If the results of BCH check is less than 70%, the value of F is made clear (720), N+1 is substituted for N, namely increment by 1 (703).

Like this, the radio selective receiver of the present invention conducts higher clock processing when receiving signals in a normal electric field by setting the frequency division ratio lower, or conducts lower clock processing when receiving signals in an abnormal electric field by setting the frequency division ratio to 1.

What is claimed is:

1. A portable information equipment system comprising:

a paging data receiver, said paging receiver including:
 a receiver which receives radio selective calling signals; and
 a notification circuit which produces reception start information signifying a start of reception by said receiver;
said portable information equipment system further comprising:
 a portable information device,
said paging data receiver being attachable to and detachable from said portable information device,
said portable information device including:
 a system clock, said system clock normally operating at a first clock rate; and
 a switch, said switch being operative to switch the clock rate of said system clock to a second clock rate lower than said first clock rate in response to said reception start information from said notification circuit,
 said switch including a frequency divider which divides said system clock rate;
said notification circuit being operative to send frequency division ratio information to said portable information device, said frequency divider being responsive to said frequency division ratio information to set a frequency division ratio thereof,
said notification circuit being further operative to determine said frequency division ratio information based on a receiving rate of a Bose-Chaudhuri-Hocquengham check code that is obtained when receiving said radio selective calling signals.

2. A portable information equipment system comprising:

a paging data receiver, said paging receiver including:
 a receiver which receives radio selective calling signals; and
 a notification circuit which produces reception start information signifying a start of reception by said receiver and reception completion information signifying a completion of reception by said receiver;

said portable information equipment system further comprising:
   a portable information device, said paging data receiver being attachable to and detachable from said portable information device,
said portable information device including:
   a system clock, said system clock normally operating at a first clock rate; and
   a switch,
   said switch being operative to switch the clock rate of said system clock to a second clock rate lower than said first clock rate in response to said reception start information from said notification circuit and to restore said system clock to said first clock rate in response to said reception completion information from said notification circuit,
said switch including a frequency divider which divides said system clock rate;
   said notification circuit being operative to send frequency division ratio information to said portable information device,
   said frequency divider being responsive to said frequency division ratio information to set a frequency division ratio thereof corresponding to said second clock rate and to set the frequency division ratio thereof to a value of one for said first clock rate,
   said notification circuit being further operative to determine said frequency division ratio information based on a receiving rate of a Bose-Chaudhuri-Hocquengham check code that is obtained when receiving said radio selective calling signals.

3. A portable information equipment system comprising:
a paging data receiver including:
   a receiver which receives radio selective calling signals; and
   a notification circuit which provides reception starting information signifying start of reception by said receiver, reception completion information signifying completion of reception by said receiver, and frequency division ratio information; said portable information equipment system further comprising:
   a portable information device, said paging data receiver being attachable to and detachable from said portable information device, said portable information device including:
      a system clock, said system clock operable to provide a clock signal at a first frequency; and
      a switch; said switch being operative to divide said system clock signal by a frequency division ratio indicated by said frequency division ratio information when said reception start information and said frequency division ratio information are received from said notification circuit, and to increase the rate of said system clock signal by setting said frequency division ratio to one when said reception completion information is received from said notification circuit;
   said notification circuit being operative to determine said frequency division ration information based on a receiving rate by Bose-Chaudhuri-Hocquengham code check that is obtained when receiving said radio selective calling signals.

4. A system including a paging data receiver for use with a portable information device, said paging data receiver attachable to and detachable from said portable information device, said system comprising:
   an interface which connects said paging data receiver with said portable information device;
   a receiver, disposed in said paging data receiver, said receiver being operative to receive radio selective calling signals; and
   a notification circuit, disposed in said paging data receiver, said notification circuit being operative to provide reception start information signifying start of reception by said receiver and reception completion information signifying completion of reception by said receiver to said portable information device; wherein
   said portable information device including a system clock having a clock rate which is alterable by dividing said system clock rate by a frequency division ratio, said notification circuit being operative to provide said frequency division ratio to said portable information device to allow said system clock rate to be changed;
   wherein said notification circuit determines said frequency division ratio information based on a receiving rate by Bose-Chaudhuri-Hocquengham code check that is obtained when receiving said radio selective calling signals.

5. A method of controlling a portable information equipment system including a paging data receiver that receives radio selective calling signals and a portable information device that enables changing of a system clock rate of a system clock in said portable information device by dividing said system clock rate said paging data receiver attachable to and detachable from said portable information device, said control method comprising:
   (a) determining a frequency division ratio for said system clock rate of said portable information device, said determining occurring in said paging data receiver;
   (b) sending notification of reception start information of said radio selective calling signals and said frequency division ratio to said portable information device from said paging data receiver;
   (c) setting said system clock based on said frequency division ratio;
   (d) starting reception of said radio selective calling signals;
   (e) completing reception of said radio selective calling signals;
   (f) sending notification of reception completion information of said radio selective calling signals to said portable information device from said paging data receiver;
   (g) setting said frequency division ratio of said system clock to one based on receipt of said reception completion information in said portable information device;
   (h) calculating a receiving rate of a Bose-Chaudhuri-Hocquengham check code for said radio selective calling signals received in said paging data receiver;
   (i) repeating said steps (b) to (h) using said frequency division ratio if said receiving rate of said Bose-Chaudhuri-Hocquengham check code is not less than a threshold value; and
   (j) repeating said steps (b) to (h) using said frequency division ratio incremented by one if a receiving rate of said Bose-Chaudhuri-Hocquengham check code is less than said threshold value.

6. The method of claim 5, wherein said threshold value is not less than 70%.

7. The method of claim 5, further comprising repeating said steps (b) to (h) using said frequency division ratio decremented by 1 if said receiving rate of said Bose-Chaudhuri-Hocquengham check code is not less than said threshold value n times in said (i) step.

8. The method of claim 7, wherein n is 5.

9. The method of claim 5, further comprising:
sending reception completion information indicating reception of said radio selective calling signals to said portable information device; and
repeating said steps (b) to (h) using said frequency division ratio incremented by 1 if a synchronous signal can not be detected during reception of said radio selective calling signals.

* * * * *